United States Patent

Waldherr

[11] 4,023,214
[45] May 17, 1977

[54] MEANS FOR HOLDING EYEGLASSES WITHIN A SCUBA MASK

[76] Inventor: Arthur Waldherr, 3709 N. Bosworth, Chicago, Ill. 60613

[22] Filed: May 17, 1976

[21] Appl. No.: 687,004

[52] U.S. Cl. .................................. 2/444; 351/155
[51] Int. Cl.² .......................................... G02C 3/02
[58] Field of Search ............... 2/444; 351/155, 158; 128/141

[56] References Cited

UNITED STATES PATENTS

| 862,795 | 8/1907 | Blackiston | 351/155 |
|---|---|---|---|
| 3,146,295 | 8/1964 | Roland | 2/444 X |
| 3,563,640 | 2/1971 | Wise et al. | 2/444 X |

Primary Examiner—Werner H. Schroeder
Assistant Examiner—Peter Nerbun

[57] ABSTRACT

Means for holding prescription eyeglasses with the ear pieces removed in a conventional scuba mask in which the scuba mask comprises hood or body portion and a transparent wall surface at the front thereof. The means comprising a member which has a bottom portion and spaced side portions with the spaced side portions each terminating in a hooking end. The member when inserted in the scuba mask is positioned so that the bottom portion is adjacent the bottom of the hood and the opposite sides of the member are positioned adjacent the sides of the mask all adjacent the front transparent wall surface, with the upper portions of the sides of the member turned rearwardly and downwardly inside the mask and with the hooking ends engaging the frame of the eyeglasses to hold the frame in spaced relation to the front transparent wall surface of the scuba mask, so that when the scuba mask is applied to a person's face, the nose piece of the frame of the glasses will rest on the person's nose so that the person may view through said lenses and through the transparent front wall surface of the mask. The prescription eyeglasses when removed from the scuba mask may be worn in the conventional manner by reattaching the ear pieces thereto.

6 Claims, 4 Drawing Figures

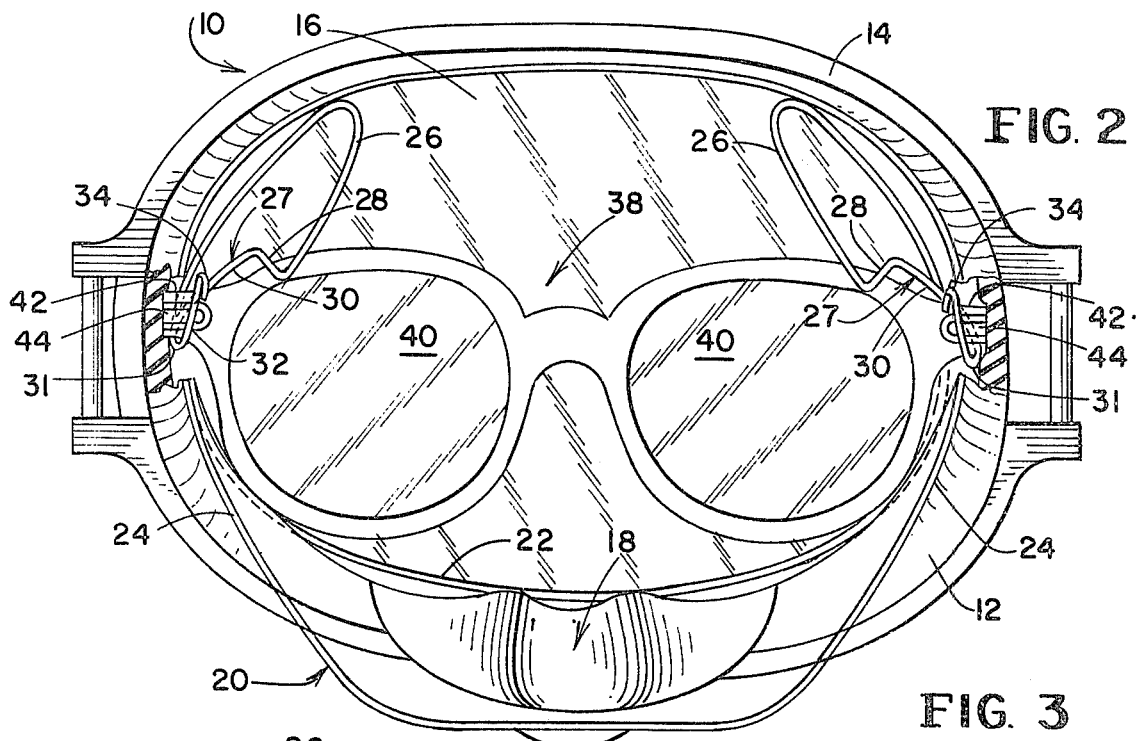
FIG. 2
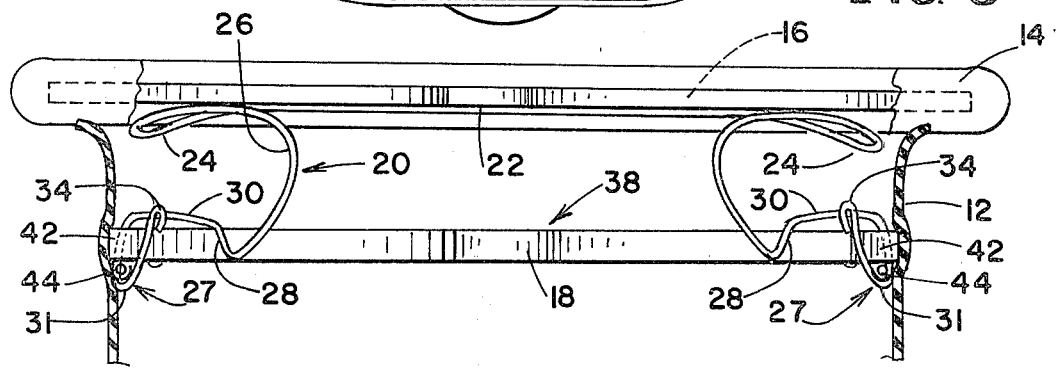
FIG. 3
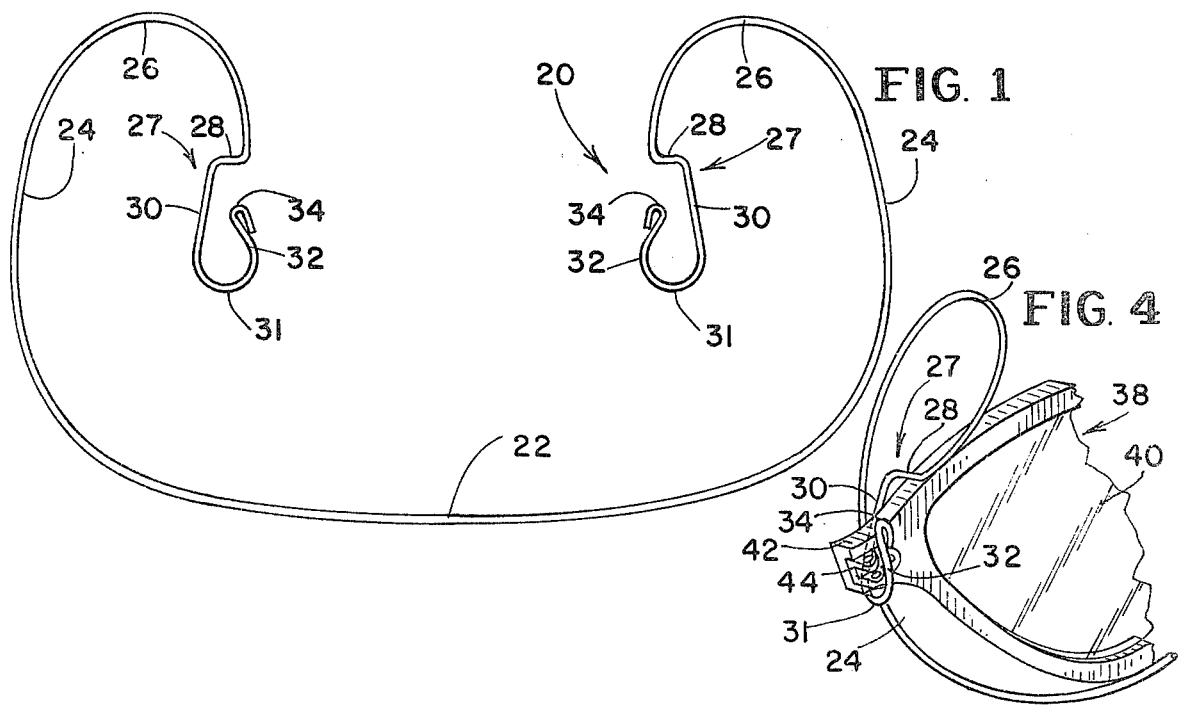
FIG. 1
FIG. 4

MEANS FOR HOLDING EYEGLASSES WITHIN A SCUBA MASK

BRIEF SUMMARY OF THE INVENTION

For persons who have to wear prescription lenses for proper vision, it is impossible for them to apply a scuba mask over the lenses as the ear pieces of the frame of the glasses would prevent the scuba hood from forming an effective seal with respect to the face and head of the person. One of the objects of this invention is therefore to provide means whereby the lens frame, with the ear pieces removed therefrom, is held in a fixed position inside of the scuba hood so that the scuba mask can be readily applied to the face of the person, with the person being able to view through the prescription lenses.

Another object of this invention is to provide means whereby the conventional prescription lenses worn by a person may be utilized by merely removing the ear pieces from the frame unit and readily inserting the frame unit into the scuba mask so that the lens frame member and lenses are held in a fixed position relative to the front or face of the scuba mask so that the scuba mask may be utilized in the conventional manner, yet providing the necessary visual benefits of the prescription lenses.

Another object of this invention is to provide a holder formed of wire which is relatively inexpensive to manufacture and which may be readily attached to the eye lenses frames of eyeglasses to support the eyeglasses within the scuba mask, yet permit the eyeglass frame member to be readily removed therefrom after it has served its purpose.

BRIEF DESCRIPTION OF THE DRAWINGS

FIG. 1 is a view of the wire holder as initially formed and in the manner it would be positioned on a card for purposes of display and sale.

FIG. 2 is a view looking at same from the rear of the wire holder being further bent and shown mounted within a conventional scuba mask and supporting the conventional frame which contains the prescription lenses.

FIG. 3 is a top view of FIG. 2 with the upper portion of the scuba mask broken away to show the manner in which the holder supports the frame and lenses in the scuba mask.

FIG. 4 is a fragmentary perspective showing the hooking of the holder to the eye frame.

DESCRIPTION OF THE PREFERRED EMBODIMENTS

The conventional scuba mask is indicated generally by the numeral 10 and includes a hood or body member generally indicated at 12 which is formed of rubber or like flexible material. Forwardly of the hood 12 is an oval-shaped rim 14 which supports a transparent oval-shaped window 16. The rear portion of the hood is provided with the conventional rear edge with the bottom portion of the hood shaped to provide a recess or depressed portion 18 to accommodate the nose. The scuba mask is applied to the face and secured to the head in the conventional manner. No invention is being herein claimed with respect to the scuba mask as same is of conventional construction. While the invention is shown in connection with a particular scuba mask, it is understood that it is applicable to all scuba masks whether round, oval or some other shapes.

The invention herein resides in the holder for holding the eyeglasses within the scuba mask so that the person may see through the lenses when wearing the scuba mask.

The holder or means for holding the eyeglasses is generally indicated at 20 and is formed of a wire member which is of stainless spring steel and highly corrosion resistant and is preshaped to the configuration shown in FIG. 1. It is integrally formed and as initially formed as shown in FIG. 1 lies in a single plane. It may also be molded of a suitable plastic material. In this form it is placed on a card for purposes of sale. The holder 20 as preshaped comprises a bottom portion 22 which is slightly curved which continues with upwardly extending curved sides 24, which sides then continue upwardly and are curved inwardly to form arcuate shaped upper portions 26 which then are bent to form the opposite end hooking members generally indicated at 27. The hooking members 27 are continuations of the wire member and comprise a short inwardly extending portion 28 which then continues downwardly to form a short straight portion 30, and then continues in a bottom rounded portion 31 with an upwardly and outwardly inclined portion 32 which is then turned inwardly and downwardly to form the terminal 34. The hooking members 27 of the holder are spaced from each other and when further bent will engage the frame and hold it in position within the hood as shown in FIGS. 2–4, as will be more subsequently described.

The conventional prescription eyeglasses comprise a lens frame member generally indicated at 38 which supports the prescription lenses 40. The lens frame member 38 of the eyeglasses is provided at the opposite upper ends thereof with the conventional extension or portion 42 to which is secured the conventional hinge member generally indicated at 44, to which is hingedly secured by a small screw the ear piece, all as well known in the art. To utilize this invention with the aforedescribed prescription lenses, it is merely necessary to remove the ear pieces which may be done by inserting a small screwdriver in the screw which holds the ear pieces and unscrewing the screw.

After the ear pieces are removed from the lens frame member 38, the holder 20 is then further bent manually by bending the arcuate-shaped portions 26 and the hooking members 27 from the plane shown in FIG. 1 rearwardly to the planes and positions shown in FIG. 4. In this manually bent shape the arcuate-shaped portions 26 will be bent to a position rearwardly and away from the window 16 when the holder 20 is inserted in the scuba mask. Likewise, the hooking members 27 will be bent to extend rearwardly of the arcuate portions 26 when inside the scuba mask. After the holder 20 has been manually reshaped as aforesaid, the lens frame 38 (without the ear pieces) are connected to the hooking member 27 as shown in FIG. 4 in which the hooking members 27 will engage the frame portions 42 to surround same and hook the lens frame to the holder. This tensions the holder 20 as the lens frame spreads the opposite arcuate portions 26 and the hooking members 27 away from each other. In this position the holder 20 and lens frame 38 are inserted into the scuba mask so that the bottom portion 22 of the holder rests against the bottom of the hood and against the inside transparent window 16, with the curved sides 26 of the holder extending upwardly and against the inside of the opposite sides of the hood as shown in FIG. 2.

The upper portion 26 and the hooking members 27 of the holder having been manually rebent will then be positioned further away and rearwardly of the window 16 of the scuba mask to hold the lens frame and lenses in a spaced relation to the window 16 as shown in FIG. 3. The eyeglasses will be held in such a fixed position so that when the mask is applied to the face of a person, the eyeglasses will be within the mask and and held in proper position in relation to the eyes of the person for proper viewing. The nose bridge of the lens frame will be in proper position to rest on the nose of the user.

After the eyeglasses have been thus used, they may be readily removed with the holder from the scuba mask and worn in the normal manner by again attaching the ear pieces thereto.

What is claimed is:

1. Means for holding conventional eyeglasses in a scuba mask in which the eyeglasses include a conventional frame having conventional hinge portions and in which the scuba mask comprises a hood or body portion and a transparent wall surface at the front thereof, said means comprising a member which is integrally formed of a single continuous element and which has a bottom portion and spaced side portions with said spaced side portions each terminating in a hooking end, said member when inserted in the scuba mask positioned so that the bottom portion is adjacent the bottom of the hood and the opposite sides of said member positioned adjacent the sides of the mask all adjacent the front transparent wall surface, with the upper portions of the sides of said member turned rearwardly and downwardly inside said mask and with the hooking ends hooking around the hinge portions of the frame of the eyeglasses to hold the frame in spaced relation to the front transparent wall surface of the scuba mask, so that when the scuba mask is applied to a person's face, the nose piece of the frame of the glasses will rest on the person's nose so that the person may view through said lenses and through the transparent front wall surface of the mask.

2. Means as set forth in claim 1 in which the member is a wire member.

3. Means as set forth in claim 2 in which the wire member is of spring steel and when supporting the frame is under tension so that it remains retained within the scuba mask.

4. Means as set forth in claim 1 in which the bottom and the spaced sides are generally curved and in which the said means is an integral wire structure.

5. Means as set forth in claim 1 in which the member is formed of wire and is initially formed in a single plane and is then manually reshaped so that the hooking ends extend rearwardly of the plane as initially formed.

6. Means as set forth in claim 2 in which the member has arcuate-shaped upper portions which when initially formed are in the same plane with the hooking ends but then are manually reshaped so that the upper portions and the hooking ends extend rearwardly of the plane as initially formed.

* * * * *